R. MARCHER.
MACHINE FOR ENAMELING MOLDINGS, &c.

No. 8,448. Patented Oct. 21, 1851.

UNITED STATES PATENT OFFICE.

ROBERT MARCHER, OF CORNWALL, NEW YORK.

MACHINERY FOR ENAMELING MOLDINGS, &c.

Specification forming part of Letters Patent No. 8,448, dated October 21, 1851; Reissued March 15, 1859, No. 674.

*To all whom it may concern:*

Be it known that I, ROBERT MARCHER, of Cornwall, county of Orange, and State of New York, have invented a new and useful Improvement in Machinery or Apparatus for Applying Enamel to Moldings and other Like Articles of Wood; and I do hereby declare that the following is a full, clear, and exact description of the same, reference being made to the annexed drawings making a part of this specification, in which—

Figure 2:
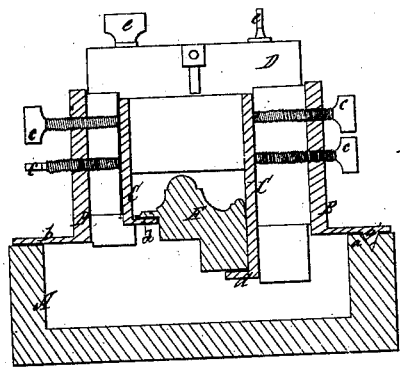
Figure 1:
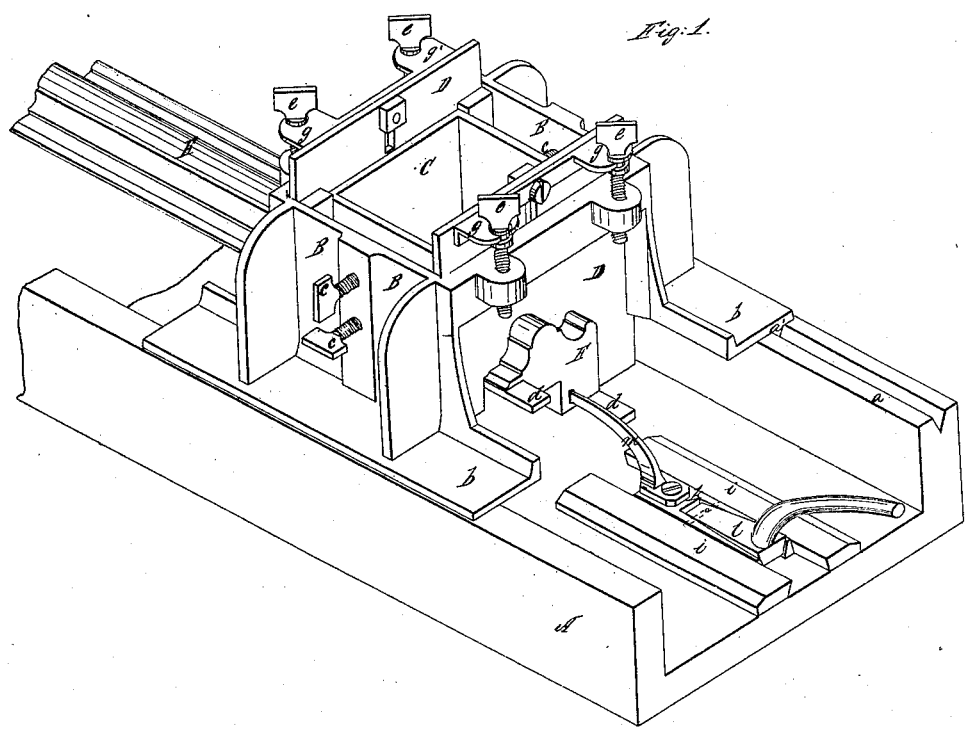

Figure 1 is a perspective view Fig. 2 a transverse section.

Similar letters refer to similar parts throughout.

My invention relates to machinery for applying the composition upon the surface of wood moldings in the process of preparing them for gilding, as well as for the purpose of making a finished enameled surface upon all materials capable of being treated in this manner.

The construction and operation is as follows—A, represents a trough made of a length equal to the length of the moldings to be enameled. On the top edge of one side a groove (a) is cut to receive the guide piece attached to the bottom side of the conveyer, at (a') to keep it in place as it slides along the top of the trough. The conveyer is seen at B and is a frame or box composed of metal or other suitable material. The top and bottom are open, the two ends are also cut away half or two thirds the distance from the bottom, so as to leave ample room for the passage of the largest piece of molding through the bottom of the conveyer. The bottom edges of the two sides terminate in flanges (b) which rest upon the top of the trough A. Within the conveyer there is a box of nearly the same length as the conveyer, but narrower at the sides; the top and bottom are open and it is capable of being raised or lowered and also moved to the one side or the other as may be required. (c) are screws tapped into the sides of the conveyer, the ends of which act against the sides of the box C and on being screwed hard against it set it firmly in any position, placed within the range of said screws. The two sides of this box are generally of unequal width, one being deeper than the other, and made to suit different sized moldings so that there are various boxes for the purpose. The bottom edges of the two sides terminate in flanges; (d) one of these flanges slides along the bottom of the rebate on the inner edge of the molding and the other at the outer edge as shown. At D are two plates of sufficient width to fit in the ends of the conveyer, these slide down between the ends of the box C and the end of B there being space enough for the purpose and so as to make at the same time a close fit. The lower edges of these plates are cut out so as to fit the outline of the upper side of the molding as clearly represented. These plates are adjusted so as to press or scrape their molded edges lightly along the surface of the molding, and this is effected by the screws (e) combined with the ears (g) and conveyer as clearly represented.

F represents a piece of molding fixed in the trough in the proper position to be acted upon by the passage of the conveyer over it. To hold it firmly in one position a clamp is applied attached to the bottom of the trough at each end. One of these clamps should be adjustable so as to be readily attached. The one exhibited in the drawings is of peculiar construction and is made as follows; (i i) are two pieces forming a dovetail or groove on the bottom of the trough; a forked piece (k) is fitted to slide freely in this groove, the inside of the fork is beveled as shown in the drawing. A wedge (l) is inserted in the fork and hinged near the head, a point (m) is fixed on the end being sharp so as to be easily driven into the end wood of the molding. To set the piece of molding in its place raise the wedge (l) by its handle then drive the point (m) into F by sliding the fork (k) along in the dovetail groove (i). As soon as the point is driven in far enough to hold, press (l) down into the fork (k) which will spring the ends of the fork open and cause them to be pressed against the sides of the groove and firmly wedged within it so as to be immovable and thereby hold the molding in place.

The operation is as follows: the molding to be enameled being fitted in the trough A as described, the conveyer is moved along to one end, the plates D set down by the screws (e) so as to press lightly upon the molding. A quantity of plaster or other material intended for the formation of the enamel having been previously prepared by reducing it to a semifluid consistence, proper to be spread upon the surface, is poured into the box C. The plates D and sides of the box C fit the inequalities of the molding so closely that none can run out, and it therefore forms a sort of sliding bottom to the box, and the composition consequently flows over and covers so much of the molding as is contained within the box. The conveyer is now made to slide along the trough and consequently passes over every portion of the molding which as it comes within the box receives a coat of the composition. In preparing moldings for gilding it is necessary that this enamel should have sufficient thickness to fill all the inequalities in the grain of the wood and form a smooth and finished surface, it is therefore requisite to apply several coats; this is done by passing the conveyer back and forth until the requisite quantity has been applied. The plates D act as a scraper or leveler and the thickness of each coat is regulated by raising the molded edge of that plate which follows, in which ever direction the conveyer is moving; hence the quantity which is left upon the molding as the conveyer passes over is regulated by the width of the opening thus made, and the edge also of the plate acts as a leveler or smoother leaving a finished surface of the exact form of the molding as cut on the lower edge of the plates.

There are some modifications of this machine which may be made and certain parts substituted for others; thus instead of the box C formed in one piece, two plates formed like the sides of C may be substituted. When such plates are used the points of the screws (c) instead of merely pressing against the sides as at present, should be connected to them by passing through and holding by a pin and washer or like contrivance on the inside, so that while setting up the plates, a shoulder turned on near the point would take the pressure, and on unscrewing, the plates would be drawn back by the washer and pin on the inside.

The particular use of the flanges (d) is to hold up the molding to the requisite position with reference to the plates; in order to constitute it the bottom of the reservoir.

At each end of the molding there may be placed a cup to receive any composition which may be driven before the conveyer, in its passage back and forth.

What I claim as of my own invention is—

1. The arrangement of the conveyer constructed so as to form in connection with the molding or the article to be enameled a reservoir to contain the composition, said molding forming, as it were, a sliding bottom to the reservoir by which means the composition is spread upon its surface as set forth.

2. I claim also the clamp for fastening and releasing the end of the article to be enameled the whole being constructed and operating substantially in the manner and for the purpose described herein.

ROBT. MARCHER.

Witnesses:
  S. H. MAYNARD,
  JOHN W. KILSBY, Jr.

[FIRST PRINTED 1913.]